United States Patent [19]

Takada et al.

[11] Patent Number: 4,494,491

[45] Date of Patent: Jan. 22, 1985

[54] LIQUID-COOLED INTERNAL COMBUSTION ENGINE

[75] Inventors: Toshiyuki Takada; Shinichi Tamba, both of Hyogo, Japan

[73] Assignee: Kawasaki Jukogyo Kabushiki Kaisha, Kobe, Japan

[21] Appl. No.: 382,445

[22] PCT Filed: May 10, 1979

[86] PCT No.: PCT/JP79/00118

§ 371 Date: Jan. 12, 1980

§ 102(e) Date: Dec. 26, 1979

Related U.S. Application Data

[63] Continuation of Ser. No. 186,028, Jan. 12, 1980, abandoned.

[30] Foreign Application Priority Data

May 12, 1978 [JP] Japan .................................. 53-63677

[51] Int. Cl.[3] .......................... F02F 11/00; F16J 15/02

[52] U.S. Cl. .......................... 123/41.72; 123/193 CH; 277/235 B

[58] Field of Search .......... 123/41.72, 41.74, 41.82 R, 123/41.84, 193 CH, 193 H; 277/235 B

[56] References Cited

U.S. PATENT DOCUMENTS

| | | | |
|---|---|---|---|
| 2,972,341 | 2/1961 | Forst | 123/193 CH |
| 3,340,774 | 9/1967 | Brenneke | 123/193 CH |
| 3,410,256 | 11/1968 | Herschmann | 123/41.84 |
| 3,628,427 | 12/1971 | Bailey | 123/193 CH |
| 3,843,141 | 10/1974 | Kuhn | 123/193 CH |

FOREIGN PATENT DOCUMENTS

| | | | |
|---|---|---|---|
| 177024 | 12/1953 | Austria | 123/193 CH |
| 332988 | 12/1935 | Italy | 123/41.72 |
| 323075 | 12/1929 | United Kingdom | 277/235 B |

*Primary Examiner*—Parshotam S. Lall
*Assistant Examiner*—W. R. Wolfe
*Attorney, Agent, or Firm*—Jordan and Hamburg

[57] ABSTRACT

A liquid-cooled internal combustion engine including a cylinder (1) and a cylinder head (6) wherein cooling liquid chambers (4, 9) are formed around a combustion chamber and wherein the cylinder (1) and the cylinder head (6) are interconnected through sealing means. The sealing means arranged on the contacting end surfaces of the outer shells (5, 10) of the cylinder (1) and the cylinder head (6) comprises a resilient sealing member (23, 24, 27), and the sealing means arranged in the contacting end surfaces of the inner shells (3, 8) of the cylinder (1) and the cylinder head (6) comprises a metallic sealing member (21, 21', 25).

2 Claims, 6 Drawing Figures

LIQUID-COOLED INTERNAL COMBUSTION ENGINE

This is a continuation of application Ser. No. 186,028, filed Jan. 12, 1980, now abandoned.

BACKGROUND OF THE INVENTION AND PRIOR ART STATEMENT

This invention relates to a liquid-cooled internal combustion engine, and more particularly it is concerned with sealing means for sealing between a cylinder and a cylinder head of the liquid-cooled internal combustion engine.

In a liquid-cooled internal combustion engine including a cylinder and a cylinder head each provided with an inner shell and an outer shell, the cylinder and the cylinder head being connected to each other to provide cooling liquid chambers defined by the outer shells and the inner shells of the cylinder and the cylinder head while a combustion chamber is formed by the inner shells of the cylinder and the cylinder head, it is necessary that surfaces of contact between the cylinder and cylinder head be sealed to avoid leaking of gas from the combustion chamber and leaking of cooling liquid from the cooling liquid chambers. To this end, sealing means has hitherto been provided between the cylinder and cylinder head, to avoid leaking of gas and cooling liquid. This type of sealing means of the prior art has, however, had the disadvantage that difficulties are encountered in positively avoiding, in particular, the leaking of gas from the combustion chamber, and also had the disadvantage that the production cost of the sealing means itself is high or that the production cost of the cylinder or the cylinder head is increased due to the provision of the sealing means. Also, there has hitherto been the danger that some of the sealing means interfere with normal combustion in the internal combustion engine.

FIGS. 1 to 3 show liquid-cooled internal combustion engines provided with this type of sealing means of the prior art. In order to clarify the aforesaid disadvantages of the prior art, the liquid-cooled internal combustion engines of the prior art will be described by referring to FIGS. 1 to 3.

The liquid-cooled internal combustion engine shown in FIG. 1 comprises a cylinder 1 and a cylinder head 6. The cylinder 1 is provided with an inner shell 3 and an outer shell 5, and the cylinder head 6 is also provided with an inner shell 8 and an outer shell 10. The cylinder head 6 is connected at its lower end surface to the upper end surface of the cylinder 1 through sealing means comprising gasket 14. The inner shells 3 and 8 of the cylinder 1 and cylinder head 6 respectively define a combustion chamber 2, and a portion of the combustion chamber 2 defined by the inner shell 8 of the cylinder head 6 forms an upper combustion chamber 7. Moreover, the inner shells 3 and 8 and the outer shells 5 and 10 of the cylinder 1 and the cylinder head 6 respectively define cooling liquid chambers 4 and 9 communicating with each other.

As shown in FIG. 2, the gasket 14 is formed of an annular asbestos plate 12 which has core bars 11 embedded therein and grommets 13 of stainless steel wound around the inner and outer peripheries thereof. The gasket 14 of this construction is arranged between the end surfaces of the cylinder 1 and cylinder head 6, and the contacting surfaces of the cylinder 1 and cylinder head 6 are sealed by the gasket 14 as the cylinder 1 and cylinder head 6 are fastened together by bolts 15.

The liquid-cooled internal combustion engine shown in FIG. 3 is similar to that shown in FIG. 1 in that it includes the cylinder 1 having the inner shell 3 and outer shell 5, the cylinder head 6 having the inner shell 8 and outer shell 10, the combustion chamber 2, its upper combustion chamber 7, cooling liquid chambers 4 and 9, the bolts 15 etc. However, in the construction shown in FIG. 3, annular grooves 16 are formed on the upper end surfaces of the inner shell 3 and outer shell 5 respectively of the cylinder 1 and have fitted therein sealing means comprising O-rings 17 formed of heat resisting rubber and having a thickness large enough to enable the rings to project outwardly from the grooves 16. The O-rings 17 are held between the end surfaces of the cylinder 1 and cylinder head 6 by the clamping force exerted by the bolts 15, to thereby provide a seal between the end surfaces.

Typical examples of the liquid-cooled internal combustion engines of the prior art have been described hereinabove. In the sealing means of the internal combustion engine shown in FIG. 1, excessive pressure is applied to the gasket 14 which undergo permanent deformation as the result of thermal expansion of the inner shells 3 and 8 and outer shells 5 and 10 as the internal combustion engine operates, so that the bolts 15 might become unable to exert enough clamping force. Also, since the area of contact between the end surfaces and the gasket 14 is large, pressure per unit area acting on the gasket 14 is low and consequently the gasket 14 is unable to perform a satisfactory sealing action, resulting in the danger that gas might leak from the combustion chamber 2. Furthermore, since the gasket 14 is pressed as the bolts 15 are tightened, the grommets 13 on the inner and outer peripheries of the asbestos plate 12 are pressed verticaly while being held and tightened. However, because of this, there is the danger that the grommets 13 might be dislodged from the boundary between them and the asbestos plate 12. Also, the asbestos plate constituting the gasket 14 is low in thermal conductivity, so that heat of combustion gas tends to collect in the stainless steel grommet 13 on the inner peripheral edge of the gasket 14 in the inner shell. As a result the grommet 13 is overheated, so that there is the danger that the fuel-air mixture in the combustion chamber might be ignited by the overheated grommet 13 and abnormal combustion of the internal combustion engine is caused to take place. Furthermore, the gasket 14 should be subjected to dipping treatment with special liquid to avoid leakage of liquid from the cooling liquid chambers and seeping of water through holes 14_a_ for the bolts 15. Thus the production cost of the sealing means is increased.

Furthermore, in the liquid-cooled internal combustion engine shown in FIG. 3, to fit the lower end surfaces of the inner shell 8 and outer shell 10 on the upper end surfaces of the inner shell 3 and outer shell 5 respectively, it is necessary to impart high precision finishes to these end surfaces. Also, the complex shapes of the outer shells 5 and 10 which are generally the case makes it quite difficult to work them to form the annular grooves 16. In addition, to provide the annular grooves 16 in the outer shell 5 (or the outer shell 10 as the case may be) requires an increase in the thickness of the outer shells 5 and 10 or the provision of flanges 5_a_ and 10_a_ in the contacting portions of the outer shells 5 and 10 as shown. When the flanges 5_a_ and 10_a_ are provided, it is necessary to use cores for producing the cylinder 1 and cylinder head 6, thereby reducing productivity.

The following disadvantage can be cited as a serious one which is shared by the constructions shown in FIGS. 1 and 3. Generally, in this type of internal combustion engine, the pressure in the combustion chamber 2 becomes high. Thus in order to provide a satisfactory seal between the end surfaces of the inner shells 3 and 8 of the cylinder 1 and cylinder head 6 respectively, it is necessary to apply high pressure to the sealing means interposed between the inner shells 3 and 8 to positively avoid leakage of gas from the combustion chamber 2. Meanwhile the pressure in the cooling liquid chambers 4 and 9 is not as high as that in the combustion chamber 2, so that relatively low pressure has only to be applied to the sealing means arranged on the contacting surfaces of the outer shells 5 and 10. However, in conventional liquid-cooled internal combustion engines, as can be seen in FIGS. 1 and 3, the sealing means on the inner shell side and the sealing means on the outer shell side are subjected to substantially the same pressure per unit area by the bolts 15. Consequently, there might arise the situation inwhih the pressure applied to the sealing means on the inner shells 3 and 8 is not enough although unnecessarily high pressure is applied to the sealing means on the outer shells 5 and 10. Stated differently, there is the danger that the clamping force exerted by the bolts 15 is taken over by the sealing means on the outer shells 5 and 10 of larger sealing area and insufficiently high pressure is applied to the sealing means on the inner shells 3 and 8. Therefore, it is necessary to use a clamping force of very high magnitude to clamp the seaing means on the inner shell side with sufficiently high pressure as by increasing the number of the bolts 15.

This invention has as its object the provision of a liquid-cooled internal combustion engine which is free from the aforesaid disadvantages of the prior art.

SUMMARY OF THE INVENTION

This invention provides, in a liquid-cooled internal combustion engine comprising a cylinder and a cylinder head each including an inner shell and an outer shell, the cylinder head being connected at its lower end surface to the upper end surface of the cylinder and the outer shells and the inner shells of the cylinder and the cylinder head defining cooling liquid chambers while the inner shells of the cylinder and the cylinder head defining a combustion chamber, a gap between the upper end surface of the outer shell of the cylinder and the lower end surface of the outer shell of the cylinder head, a resilient sealing member inserted in the gap, and a metallic sealing member held between the upper end surface of the inner shell of the cylinder and the lower end surface of the inner shell of the cylinder head. By these features, it is possible to eliminate the aforesaid disadvantages of the prior art. More specifically, it is possible to increase the surface pressure of the upper end surface of the inner shell of the cylinder and the lower end surface of the inner shell of the cylinder head in contact with each other, and the metallic sealing member interposed between the contacting surfaces has high strength because of its being metal. Thus it decreases the chance that the sealing member will undergo permanent deformation due to thermal expansion of the inner shells of the cylinder and cylinder head, thereby reducing gas leaks from the combustion chamber as compared with the prior art.

The presence of the metallic sealing member between the upper end surface of the inner shell of the cylinder and the lower end surface of the inner shell of the cylinder head enables abnormal combustion to be minimized which has hitherto tended to occur in the vicinity of the grommets of stainless steel disposed on the inner periphery of the gasket, because the sealing member has a higher thermal conductivity than the gasket of the prior art or acts in a manner that does not interfere with the transfer of heat since the sealing member is made of metal.

Additionally, the insertion of the resilient sealing member between the upper end surface of the outer shell of the cylinder and the lower end surface of the outer shell of the cylinder head in such a manner that the sealing member is compressed by and held between the end surfaces to provide a seal therebetween eliminates the need to increase the thickness of the outer shells of the cylinder and cylinder head which is felt necessary when the sealing means comprising an O-ring of the prior art is provided to the outer shells and to form flanges in the contacting portions of the cylinder and the cylinder head. Thus it is unnecessary to use cores when the cylinder and cylinder head are produced by casting and this makes it possible to obtain the product economically. After casting, the upper end surface of the outer shell of the cylinder and the lower end surface of the outer shell of the cylinder head do not require fine finishes and can tolerate relatively coarse surface finishes, so that the advantages of improvement in productivity etc. are obtained.

Additionally, the sealing member in the contacting portions of the inner shells is susceptible to greater deformation than the sealing member in the contacting portions of the outer shells, because a gap is formed between the upper end of the outer shell of the cylinder and the lower end of the outer shell of the cylinder head and a sealing member made of resilient material is inserted in the gap while a metallic sealing member is provided to the contacting portions of the inner shells. Thus when the cylinder and cylinder head are clamped by clamping means such as bolts the clamping force primarily acts on the metallic sealing member on the inner shell side and very low pressure is applied to the resilient sealing member on the outer shell side. This makes it possible to use a lower clamping force than has hitherto been required in the prior art to apply higher pressure to the metallic sealing member in the contacting portions of the inner shells to thereby positively provide a seal to the combustion chamber.

Generally, when an internal combustion engine operates, a marked temperature difference is produced between a portion of the cylinder head near the combustion chamber and the outer peripheral portion of the cylinder head, thereby causing the cylinder head to undergo thermal deformation. When this is the case, the thermal deformation of the portion of the cylinder head near the combustion chamber is minimized and the cylinder head tends to undergo a relatively great thermal deformation in its outer marginal portion, because the portion of the cylinder head near the combustion chamber in general is sturdy and the clamping means, such as bolts, is located in the portion of the cylinder head near the combustion chamber. According to the construction of the invention, even if such situation occurs, the presence of the resilient sealing member in the gap formed between the end surfaces of the outer shells of the cylinder and cylinder head enables the thermal deformation of the cylinder head in its outer shell zone to be fully absorbed by the resilient sealing member, thereby enabling the sealing means to perform its function stably.

DETAILED DESCRIPTION OF PREFERRED EMBODIMENTS

The present invention will be explained by referring to the accompanying drawings, to give a detailed description thereof.

Figure 1:
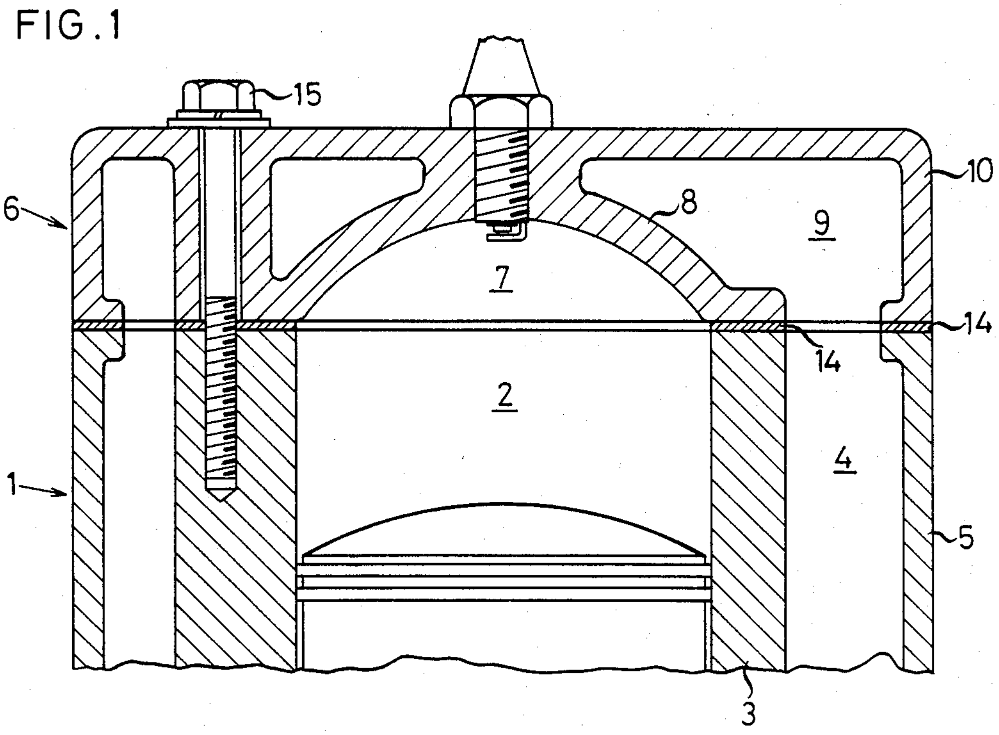
FIG. 1 is a sectional view of the essential portions of a liquid-cooled internal combustion engine provided with sealing means of the prior art.
Figure 2:
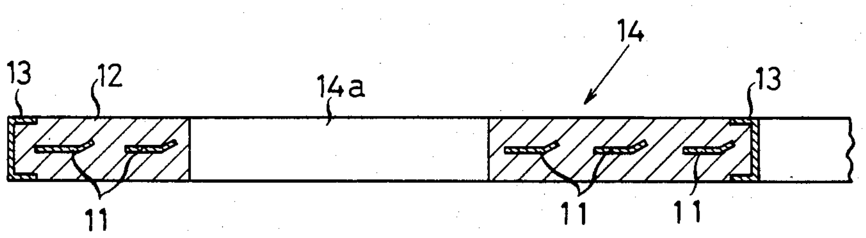
FIG. 2 is a fragmentary sectional view, shown on an enlarged scale, of the gasket shown in FIG. 1.
Figure 3:
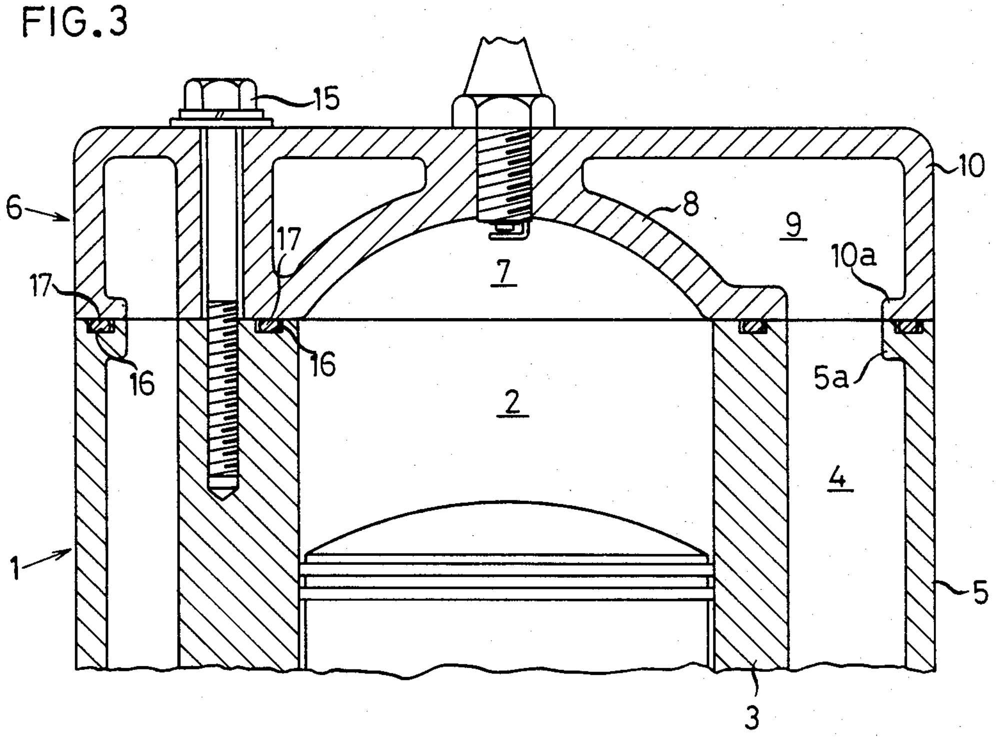
FIG. 3 is a sectional view of the essential portions of a conventional liquid-cooled internal combustion engine different from that shown in FIG. 1.
Figure 4:
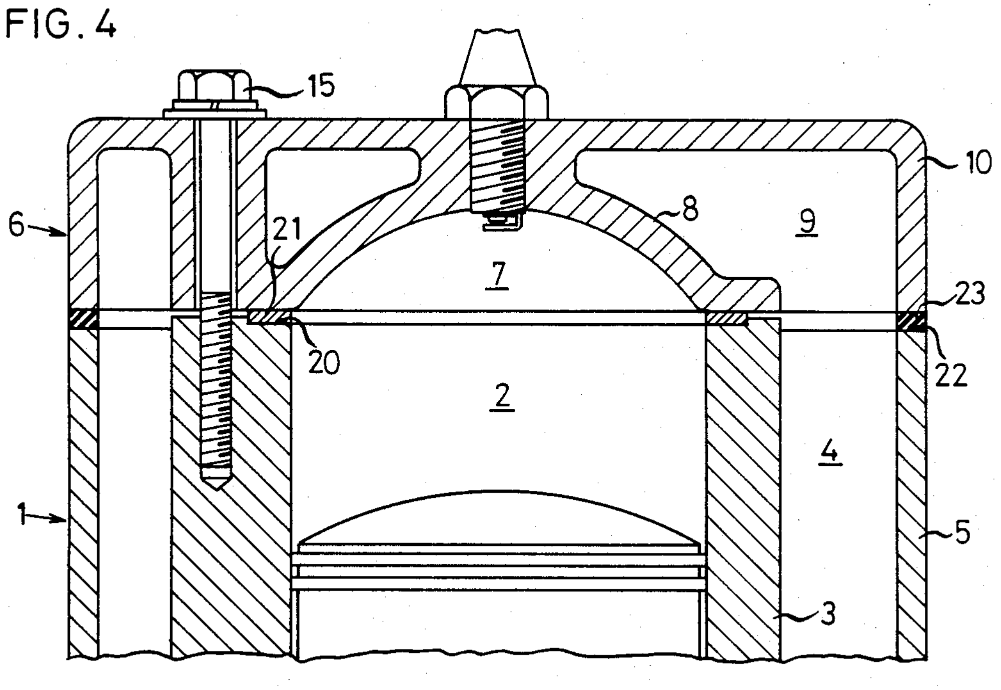
FIGS. 4 to 6 are sectional views of the essential portions of the liquid-cooled internal combustion engines according to the present invention.
Figure 5:
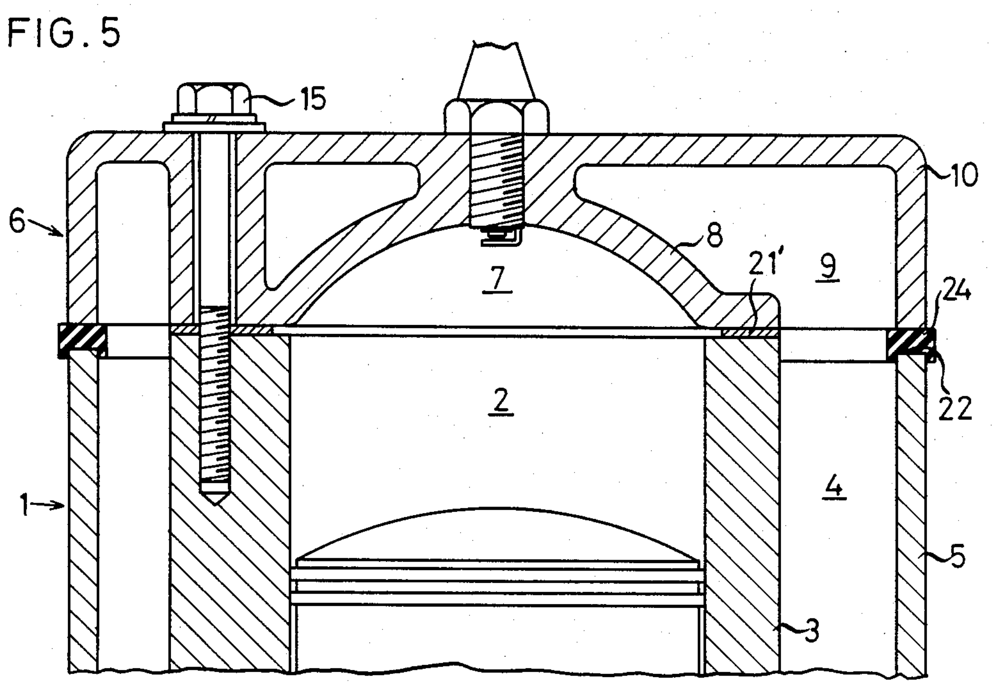
Figure 6:
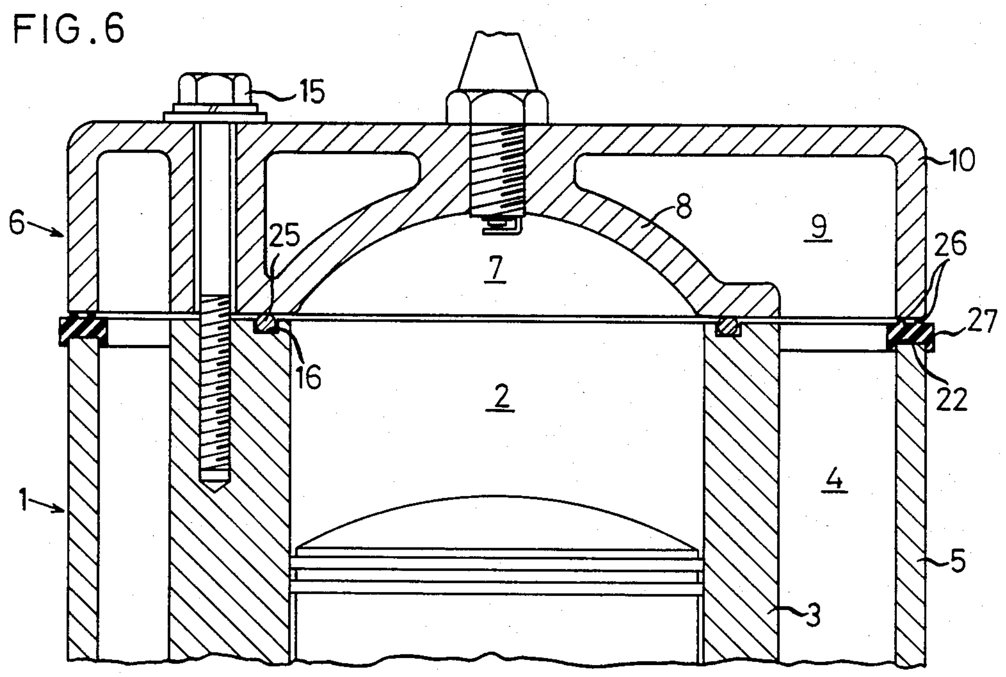

FIGS. 4 to 6 show preferred embodiments of the invention, and in these figures parts similar to those shown in FIGS. 1 to 3 are designated by like reference characters. In the liquid-cooled internal combustion engine shown in FIGS. 4 to 6, the cylinder 1 including the inner shell 3 and outer shell 5, the cylinder head 6 including the inner shell 8 and outer shell 10, the combustion chamber 2 and the upper combustion chamber 7 defined by the inner shells 3 and 8, the bolts 15 for clamping the cylinder 1 and cylinder head 6, the communicating liquid chambers 4 and 9 defined by the outer shells 5 and 10 and inner shells 3 and 8 etc. are identical with those shown in FIGS. 1 and 3, and detailed description therof are omitted.

In FIG. 4 showing a first embodiment, an annular stepped portion 20 is formed on the inner peripheral edge of the upper end surface of the inner shell 3 of the cylinder 1 and a metallic sealing member 21 of a larger thickness than the depth of the stepped portion 20 is fitted in the annular stepped portion 20. The metallic sealing member 21 is preferably made of a metal high in thermal resistance, compressive strength and thermal conductivity (or not preventing the transfer of heat). Many metals meet these requirements. However, when the need to reduce cost is taken into consideration, it is advantageous to form the metallic sealing member of copper.

Meanwhile the upper end surface of the outer shell 5 of the cylinder 1 is smaller in height than the upper end surface of the inner shell 3 and a gap 22 is formed between the upper end surface of this shell and the lower end surface of the outer shell 10 of the cylinder head 6. Arranged in the gap 22 along the end surfaces of the shells is a resilient sealing member 23 made as of rubber or other resilient material.

The cylinder 1 and cylinder head 6 are clamped and fixed by bolts 15. By this clamping, the upper end surface of the inner shell 3 of the cylinder 1 is brought into contact with the lower end surface of the inner shell of the cylinder head 6 with the metallic sealing member being interposed therebetween, so that the contacting portions are sealed by the metallic sealing member 21 held between the end surfaces. At the same time, the resilient sealing member 23 compressed and held between the upper end surface of the outer shell 5 of the cylinder 1 and the lower end surface of the outer shell 10 of the cylinder head 6 provides a seal therebetween.

In the embodiment shown in FIG. 5, an annular metallic sealing member 21' made as of copper as in the metallic sealing member 21 of the preceding embodiment is arranged between the upper end surface of the inner shell 3 of the cylinder 1 and the lower end surface of the inner shell 8 of the cylinder head 6. The upper end surface of the outer shell 5 of the cylinder 1 is smaller in height than the upper end surface of the inner shell 3 and the gap 22 is formed between the upper end surface of the outer shell 5 and the lower end surface of the outer shell 10 of the cylinder head 6, so that a resilient sealing member 24 made as of rubber is fitted in the gap 22 along the end surfaces of the outer shells. The resilient sealing member 24 of this embodiment is substantially in the form of an inverted letter U in cross section. With the cylinder 1 and cylinder head 6 being clamped and fixed by the bolts 15, the contacting portions at the upper end surface of the inner shell 3 of the cylinder 1 and the lower end surface of the inner shell 8 of the cylinder head 6 are sealed by the metallic sealing member 21', and the resilient sealing member 24 compressed and held between the upper end surface of the outer shell 5 of the cylinder 1 and the lower end surface of the outer shell 10 of the cylinder head 6 provides a seal therebetween.

In the embodiment shown in FIG. 6, the annular groove 16 is formed on the upper end surface of the inner shell 3 of the cylinder 1 along the end surface and has fitted therein a metallic sealing member 25 comprising an O-ring of metal which is so thick that it projects from the groove. Meanwhile the upper end surface of the outer shell 5 of the cylinder 1 is smaller in height than the upper end surface of the inner shell 3 and the gap 22 is formed between the upper end surface of the outer shell 5 and the lower end surface of the outer shell 10 of the cylinder head 6. A resilient sealing member 27 made as of rubber is fitted in the gap 22 along the end surfaces of the outer shells. The resilient sealing member 27 of this embodiment is also in the form of an inverted letter U in cross section and formed with two ribs 26 on its upper surface. With the cylinder 1 and cylinder head 6 being clamped and fixed by the bolts 15, the upper end surface of the inner shell 3 of the cylinder 1 is brought into contact with the lower end surface of the inner shell 8 of the cylinder head 6, and the metallic sealing member 25 comprising a compressed metallic O-ring provides a seal to the contacting surfaces. The resilient sealing member 27 compressed and held between the upper end surface of the outer shell 5 of the cylinder 1 and the lower end surface of the outer shell 10 of the cylinder head 6 provides a seal therebetween. The metallic sealing member 25 of this embodiment performs the same function as the metallic seaing members 21 and 21' of the preceding embodiments. Thus the metallic sealing member 25 preferably is made of material high in thermal resistance, thermal conductivity and compressive strength, such as copper.

The annular stepped portion 20 for fitting therein the metallic sealing member 21 shown in FIG. 4 and the annular groove 16 for fitting therein the metallic O-ring shown in FIG. 6 may be formed on the lower end surface of the inner shell 8 of the cylinder head 6. In the embodiments described, the gap 22 between the upper end surface of the outer shell 5 of the cylinder 1 and the lower end surface of the outer shell 10 of the cylinder head 6 is formed by reducing the height of the upper end of the outer shell 5 of the cylinder 1. However, it may be formed by reducing the height of the lower end of the outer shell 10 of the cylinder head 6. Also, when a metallic sealing member of sufficiently large thickness is held between the upper end surface of the inner shell of the cylinder and the lower end surface of the inner shell of the cylinder head, the gap may be formed merely by the presence of this metallic sealing member held therebetween. The resilient sealing members 24 and 27 shown in FIGS. 5 and 6 may be fitted in the gap 22 in the up-side-down position. As described hereinabove, the metallic sealing members 21 and 21' interposed between the upper end surface of the inner shell 3 of the cylinder 1 and the lower end surface of the inner shell 8 of the cylinder head 6 as shown in FIGS. 4 and 5 may be made of suitable material other than copper. For example, an annular aluminum plate may be advantageously used.

Likewise, the metallic sealing member 25 comprising a metallic O-ring as shown in FIG. 6 may be made of suitable metallic material of high thermal resistance.

In the construction according to the invention described hereinabove, a metallic sealing member is used as sealing means for the inner shells and a resilient sealing member is used as sealing means for the outer shells. By this arrangement, it is possible to apply higher pressure to the metallic sealing member for the inner shells than the resilient sealing member for the outer shells, thereby enhancing the seal provided to the combustion chamber.

What is claimed is:

1. Sealing system for a liquid cooled internal combustion engine, comprising an engine section including a combustion cylinder with inner and outer shells, and a cylinder head with inner and outer shells, a combustion chamber being formed inside the inner shells of the combustion cylinder and the cylinder head, an annular cooling liquid chamber being formed between the outer shells and the inner shells of the combustion cylinder and the cylinder head, an upper end of the inner shell of the combustion cylinder having an annular recess, and an annular gap being formed between the outer shell of the combustion cylinder and the outer shell of the cylinder head when the inner shell of the cylinder head abuts against the inner shell of the combustion cylinder, a metallic sealing member to be disposed in the annular recess of the inner shell of the combustion cylinder, said metallic sealing member being thicker than the annular recess so that the metallic sealing member directly abuts against the inner shell of the cylinder head to form a seal therewith, and a resilient sealing member positioned between the outer shell of the combustion cylinder and the outer shell of the cylinder head, said resilient sealing member having a U-shaped cross-section with ribs on the botton thereof extending in the opposite direction relative to the projecting direction of the U-shaped portion and being thicker than the annular gap so that when the cylinder head is firmly attached to the combustion cylinder, the metallic sealing member seals the inner shells and the resilient sealing member deforms and seals the outer shells completely.

2. Sealing system for a liquid cooled internal combustion engine, comprising an engine section including a combustion cylinder with inner and outer shells, and a cylinder head with inner and outer shells, a combustion chamber being formed inside the inner shells of the combustion cylinder and the cylinder head, an annular cooling liquid chamber being formed between the outer shells and the inner shells of the combustion cylinder and the cylinder head, and an annular gap being formed between the outer shell of the combustion cylinder and the outer shell of the cylinder head when the inner shell of the cylinder head abuts against the inner shell of the combustion chamber, a metallic sealing member positioned between the inner shell of the combustion chamber and the inner shell of the cylinder head for sealing the combustion chamber, and a resilient sealing member positioned between the outer shell of the combustion cylinder and the outer shell of the cylinder head, said resilient sealing member being thicker than the annual gap and having a U-shaped cross-section with ribs on the bottom of the sealing member, said ribs extending in the opposite direction relative to the projecting direction of the U-shaped sealing member so that when the cylinder head is firmly attached to the combustion cylinder, the metallic sealing member seals the inner shells and the resilient sealing member deforms and seals the outer shells completely.

* * * * *